(No Model.)
W. C. DONALDSON.
CAR COUPLING.
No. 259,509. Patented June 13, 1882.
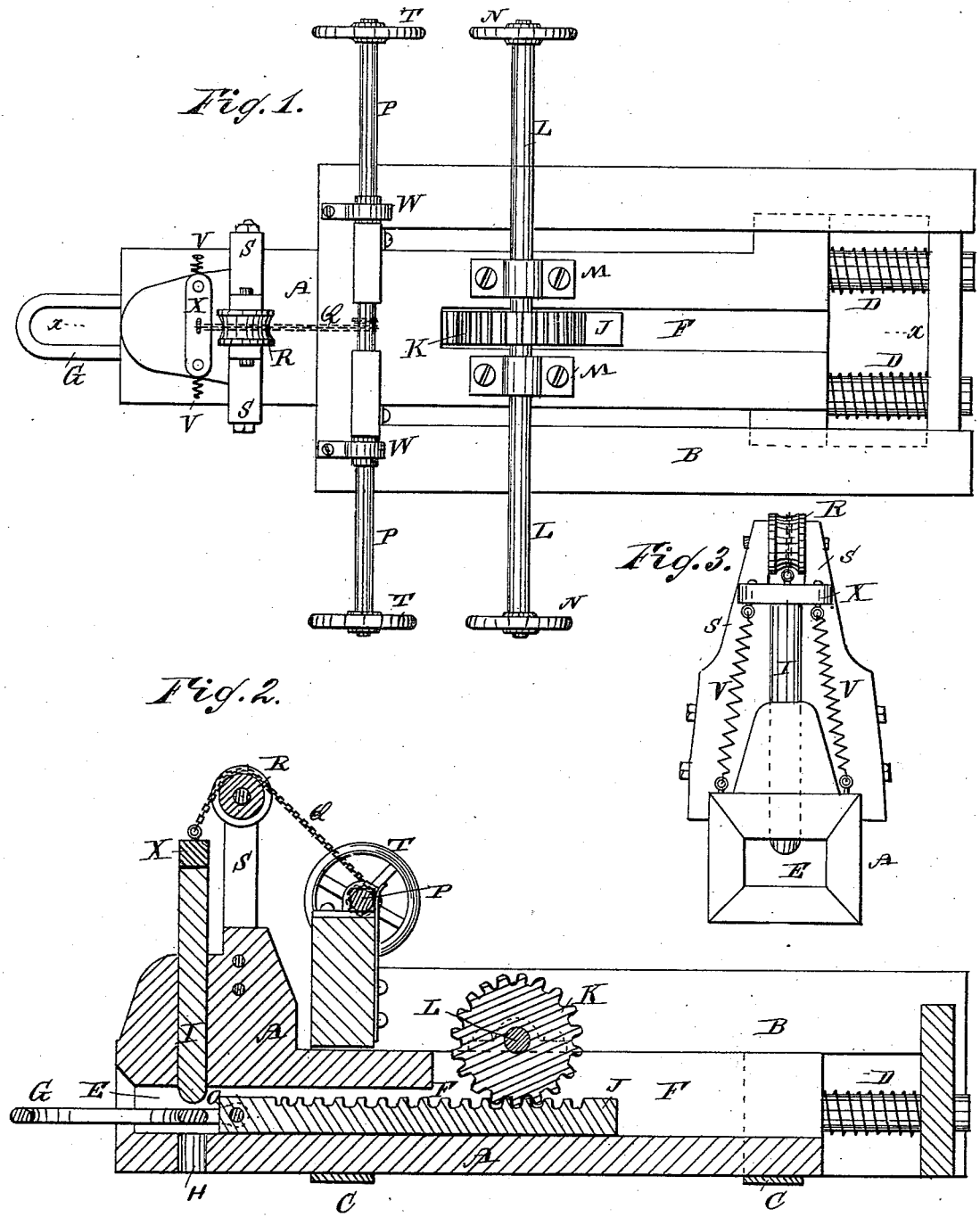
WITNESSES:
Theo. G. Hoster
C. Sedgwick
INVENTOR:
W. C. Donaldson
BY Munn & Co.
ATTORNEYS.

UNITED STATES PATENT OFFICE.

WILLIAM C. DONALDSON, OF ATCHISON COUNTY, KANSAS.

CAR-COUPLING.

SPECIFICATION forming part of Letters Patent No. 259,509, dated June 13, 1882.

Application filed April 7, 1882. (No model.)

*To all whom it may concern:*

Be it known that I, WILLIAM C. DONALDSON, of Atchison county, near Nortonville, in the county of Jefferson and State of Kansas, have invented a new and Improved Car-Coupling, of which the following is a full, clear, and exact description.

This invention consists of apparatus for drawing the link back into a groove in the draw-bar and thrusting it out again by means of a shaft with a crank or hand wheel, to be worked from either side of the car; also, a similar contrivance for raising and dropping the coupling-pin, to be applied to freight-cars, for coupling them more safely than can be done by going between the cars, all as hereinafter described.

Reference is to be had to the accompanying drawings, forming part of this specification, in which similar letters of reference indicate corresponding parts in all the figures.

Figure 1 is a plan view of my improved car-coupling apparatus and part of the frame of a car. Fig. 2 is a longitudinal sectional elevation of Fig. 1 on line $x\ x$, and Fig. 3 is a front elevation.

A represents the draw-bar, which is to be fixed in the car in the usual or any approved way to slide on the frame B and supports C, and provided with the buffer-springs D. From the link-socket E there is a groove, F, extending along the whole length of the draw-bar in the upper side, in which the link G can slide back sufficiently beyond the hole H for the coupling-pin I to allow the link of another car to enter, and wherein there is a toothed bar, J, to be worked forward and backward by a pinion, K, on a shaft, L, supported in suitable bearings, M, on the draw-bar each side of the groove, and extending each way to the sides of the car, where said shaft L is provided with a crank or hand wheel, N, at each end for turning it. The front end of this toothed bar J is to be connected to the link G either by a yoke, O, to be permanently attached, or by a spring-clip, which will grip and hold the link when thrust in, and will also release it when vigorously pulled, so that the link can be taken out when it is desired to do so—for instance, to couple with another car having the same kind of coupling—and the said connecting device is to be adapted to hold the link up to the proper level for coupling with another car when thrust out by the bar J.

To operate the pin I from the sides of the car, the said pin is suspended from another shaft, P, by a chain, Q, running over a pulley, R, arranged over the link in suitable standards, S, the said shaft being arranged in bearings W, attached to the car-body, and is also provided with crank or hand wheels T, for turning it to raise the pin by winding the chain on the shaft and dropping it by unwinding the chain. In order that the pin shall be more sure to fall when the chain is let go, the springs V are attached to the head X of the pin to pull it down.

When two cars provided with my connected rack-bar and link are to be coupled the link G of either one of the cars is withdrawn into the draw-head by revolution of shaft L, so that the pin I may be dropped through the projecting link of one car by turning of shaft P, and cars having my improved coupling may readily be coupled with cars having the common draw-head, either provided or not with a connecting-link.

If the common draw-heads have attached coupling-link, the link G of my device will be withdrawn to admit the link of the common coupler for coupling by the pin I; but if not so provided, a projected link, G, of my coupler will enter the common draw-head for coupling by its pin, as will be readily understood.

It will be seen that by this simple contrivance the link and the pin can be manipulated from the sides of the car as well as in the usual position between the cars with entire safety to the attendant so far as danger from the approaching car is concerned, and, besides, the labor is less.

I may employ other means for sliding the toothed bar J, and I do not mean to limit myself to the toothed rack and wheel arrangement for sliding the said bar.

Having thus described my invention, what I claim as new, and desire to secure by Letters Patent, is—

1. The combination of a draw-bar having a groove, F, for the link and a sliding bar, J, in said groove, connected to the link and adapted to slide the link forward and backward in said groove, substantially as specified.

2. The combination of the draw-bar having a groove, F, for the link, a sliding bar, J, in said groove connected to the link, and a toothed wheel and shaft for sliding said bar, the shaft being extended to the sides of the car and provided with crank or other devices for turning it, substantially as specified.

3. The combination, with a draw-bar having a groove, F, as described, of a sliding bar, J, in said groove having the link attached, and arranged to slide the link out and into the draw-head of another car, also to draw said link into said groove, substantially as specified.

4. The combination, with a draw-bar having a groove, F, as described, of a sliding bar, J, in said groove, having the link attached and arranged to draw said link into said groove behind the hole H, for the coupling-pin to allow the link of another car to enter and be coupled, substantially as specified.

5. The combination, with the draw-head A, the shaft P, provided with the hand-wheels T, of the pin I, provided with the cross-head X, the chain Q, and the springs V, secured to the cross-head of the pin and to the draw-head, substantially as and for the purpose set forth.

6. The combination, with the draw-head A and the shaft P, of the coupling-pin I, provided with the head X, the chain Q, the guide-pulley R, the standards S, and the springs V, substantially as and for the purpose set forth.

WILLIAM C. DONALDSON.

Witnesses:
R. H. CROSBY,
M. W. COWAN.